(12) United States Patent
Bertrand et al.

(10) Patent No.: US 8,259,637 B2
(45) Date of Patent: Sep. 4, 2012

(54) IN-BAND BACKHAUL FOR WIRELESS RELAYS IN WIRELESS NETWORKS

(75) Inventors: Pierre Bertrand, Antibes (FR); Zukang Shen, Richardson, TX (US); Eko N. Onggosanusi, Allen, TX (US); Sandeep Bhadra, Addison, TX (US); Anthony Ekpenyong, Dallas, TX (US); Tarik Muharemovic, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 350 days.

(21) Appl. No.: 12/683,291

(22) Filed: Jan. 6, 2010

(65) Prior Publication Data

US 2010/0272006 A1    Oct. 28, 2010

Related U.S. Application Data

(60) Provisional application No. 61/219,641, filed on Jun. 23, 2009, provisional application No. 61/149,231, filed on Feb. 2, 2009, provisional application No. 61/142,765, filed on Jan. 6, 2009.

(51) Int. Cl.
*H04B 7/14* (2006.01)
*H04W 4/00* (2009.01)
*H04Q 7/20* (2006.01)

(52) U.S. Cl. ........ 370/315; 370/328; 370/348; 455/450; 375/260

(58) Field of Classification Search .......... 370/216–349; 375/220–356; 455/42, 426.1, 426.2, 446, 455/452.1, 509, 561, 445, 450
See application file for complete search history.

(56) References Cited

U.S. PATENT DOCUMENTS

| | | | |
|---|---|---|---|
| 2004/0062214 A1* | 4/2004 | Schnack et al. | 370/315 |
| 2007/0265013 A1* | 11/2007 | Labedz | 455/450 |
| 2009/0010238 A1* | 1/2009 | Barak et al. | 370/342 |
| 2009/0191882 A1* | 7/2009 | Kovacs et al. | 455/450 |
| 2009/0196177 A1* | 8/2009 | Teyeb et al. | 370/231 |
| 2009/0323621 A1* | 12/2009 | Touboul et al. | 370/329 |

* cited by examiner

*Primary Examiner* — Afsar M. Qureshi
(74) *Attorney, Agent, or Firm* — Robert D. Marshall; Wade James Brady, III; Frederick J. Telecky, Jr.

(57) ABSTRACT

This invention extends the coverage and improves the capacity of wireless communication networks using relay nodes. The relay nodes are wirelessly connected to the base station. The base station uses the same radio access technology for a link between the base station and user equipment and between the base station and the relay node. The relay node uses the same radio access technology for a link between the base station and the relay node and between the relay node and the user equipment. The relay node supports at least a Physical Layer (PHY), a Medium Access Control (MAC) sub-layer and a Radio Link Control (RLC) sub-layer protocol.

14 Claims, 7 Drawing Sheets

IN-BAND BACKHAUL FOR WIRELESS RELAYS IN WIRELESS NETWORKS

CLAIM OF PRIORITY

This application claims priority under 35 U.S.C. 119(e)(1) to U.S. Provisional Application Nos. 61/142,765 filed Jan. 6, 2009, U.S. Provisional Application No. 61/149,231 filed Feb. 2, 2009 and U.S. Provisional Application No. 61/219,641 filed Jun. 23, 2009.

TECHNICAL FIELD OF THE INVENTION

The technical field of this invention is wireless telephonic and data communication.

BACKGROUND OF THE INVENTION

Figure 1:
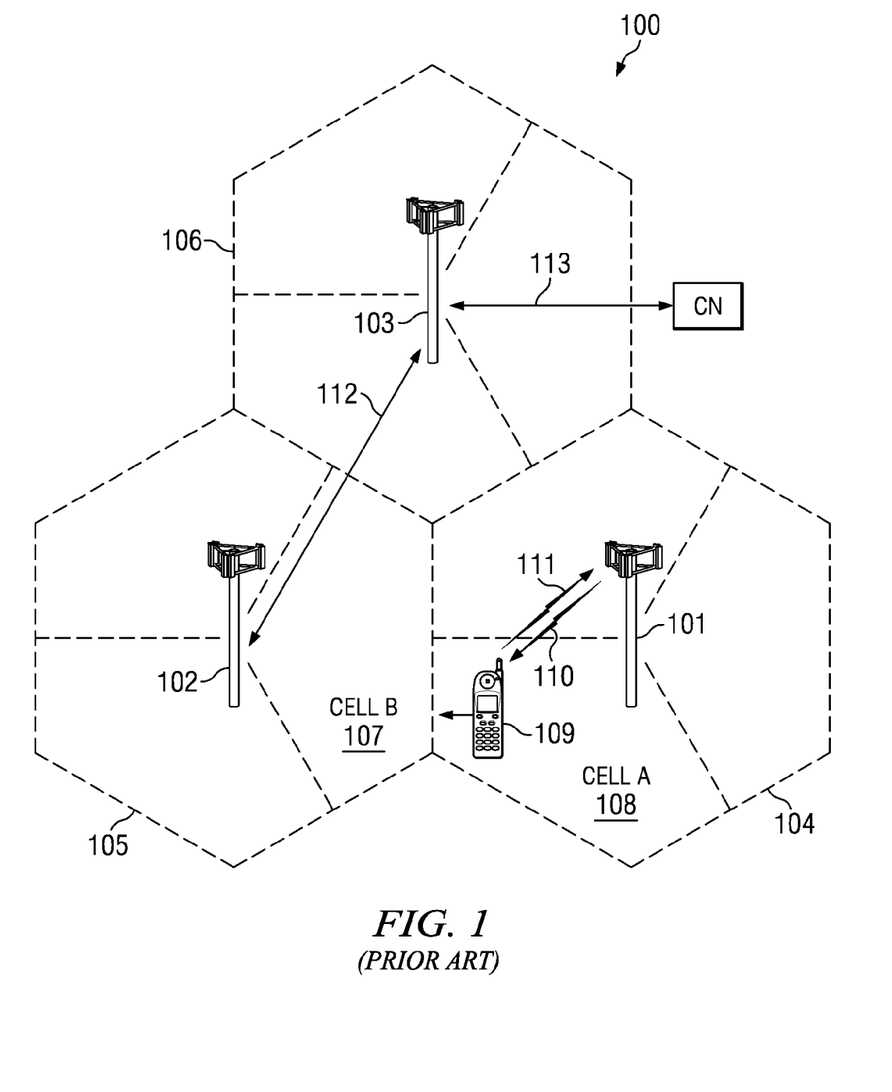
FIG. 1 is a diagram of a communication system of the prior art related to this invention having three cells.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. All Base stations forward and receive user data communications to/from the Core Network through a backhaul link 113, also referred to as S1 interface. Base station 101 transmits to and receives transmissions from UE 109. As UE 109 moves out of Cell A 108 and into Cell B 107, UE 109 may be handed over to base station 102. Base stations can be directly inter-connected through a backhaul link 112, also referred to as X2 interface, to enable fast handover and exchange resource management related information. Because UE 109 is synchronized with base station 101, UE 109 can employ non-synchronized random access to initiate handover to base station 102.

Non-synchronized UE 109 also employs non-synchronous random access to request allocation of up link 111 time or frequency or code resources. If UE 109 has data ready for transmission, which may be traffic data, measurements report, tracking area update, UE 109 can transmit a random access signal on up link 111. The random access signal notifies base station 101 that UE 109 requires up link resources to transmit the UEs data. Base station 101 responds by transmitting to UE 109 via down link 110, a message containing the parameters of the resources allocated for UE 109 up link transmission along with a possible timing error correction. After receiving the resource allocation and a possible timing advance message transmitted on down link 110 by base station 101, UE 109 optionally adjusts its transmit timing and transmits the data on up link 111 employing the allotted resources during the prescribed time interval.

SUMMARY OF THE INVENTION

This invention extends the coverage and improves the capacity of wireless communication networks using relay nodes. The relay nodes are wirelessly connected to the base station. The base station uses the same radio access technology for a link between the base station and user equipment and between the base station and the relay node. The relay node uses the same radio access technology for a link between the base station and the relay node and between the relay node and the user equipment. The relay node supports at least a Physical Layer (PHY), a Medium Access Control (MAC) sub-layer and a Radio Link Control (RLC) sub-layer protocol.

The relay node may be an out-band relay where the link between the base station and the relay node and the link between the relay node and the user equipment are at different frequencies. Alternately, the relay node may be in-band relay where the link between the base station and the relay node and between the relay node and the user equipment share the same frequency.

BRIEF DESCRIPTION OF THE DRAWINGS

These and other aspects of this invention are illustrated in the drawings, in which.

DETAILED DESCRIPTION OF PREFERRED EMBODIMENTS

Figure 2:
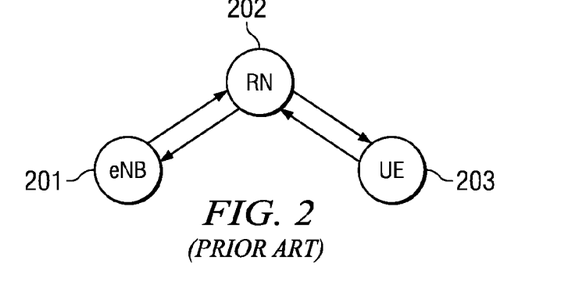
FIG. 2 illustrates an example of a 2-hop relay system.

Relay node (RN) is one of the essential elements in Long Term Evolution-Advanced (LTE-A) design of Evolved Universal Terrestrial Radio Access Network (E-UTRAN) providing coverage extension and capacity improvement of Rel-8 networks. FIG. 2 illustrates an example of a 2-hop relay system. RN 202 relays signals between Evolved Universal Terrestrial Radio Access Node B base station (eNB) 201 and UE 203. The link between eNB 201 and RN 202 is sometimes referred to as Un interface. The link between RN 202 and UE 203 is sometimes referred to as Uu interface. Such relay nodes are categorized into different classes based upon varying criteria. RN classification can be based on the available protocol stack for the user plane or control plane.

Figure 3:
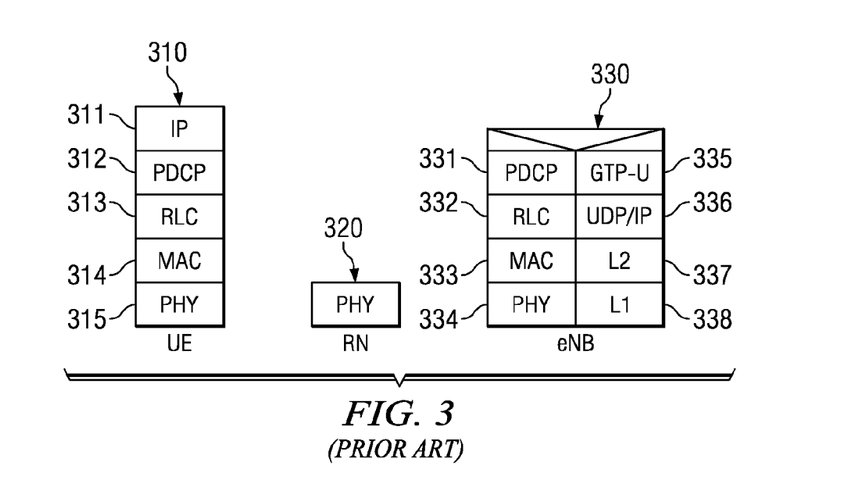
FIG. 3 illustrates the protocol layers for a relay node classified as a L0/L1 relay.
Figure 4:
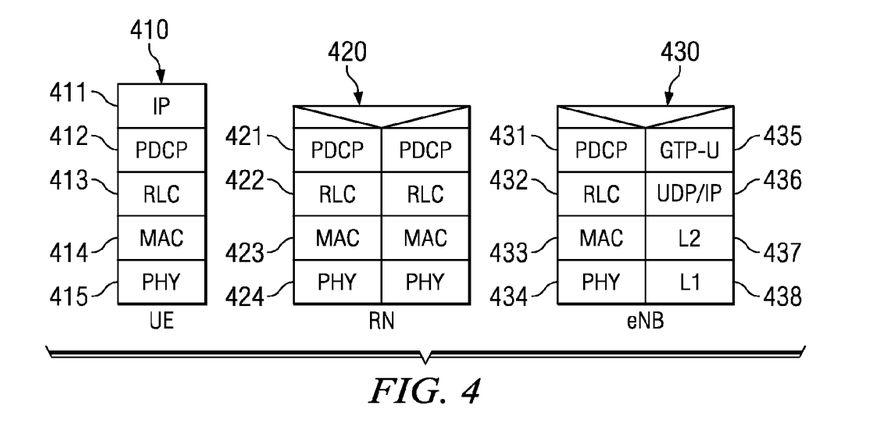
FIG. 4 illustrates the protocol layers for a relay node classified as a L2 relay.
Figure 5:
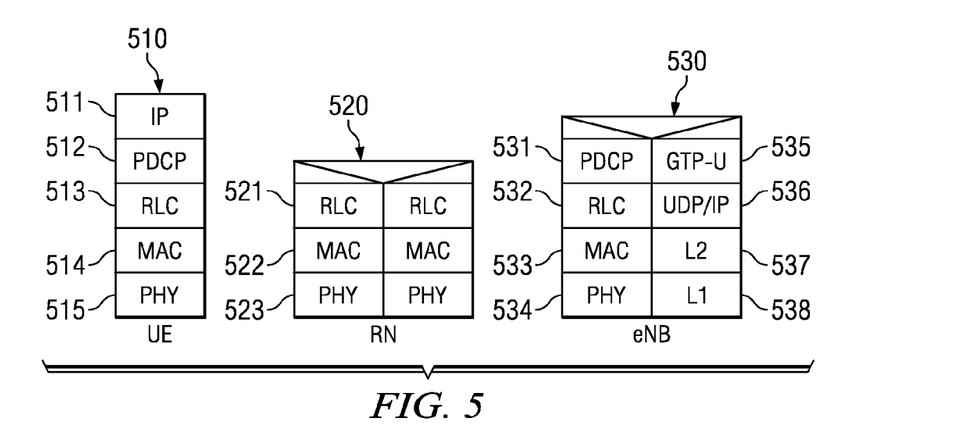
FIG. 5 illustrates the protocol layers for an alternative relay node classified as a L2 relay.
Figure 6:
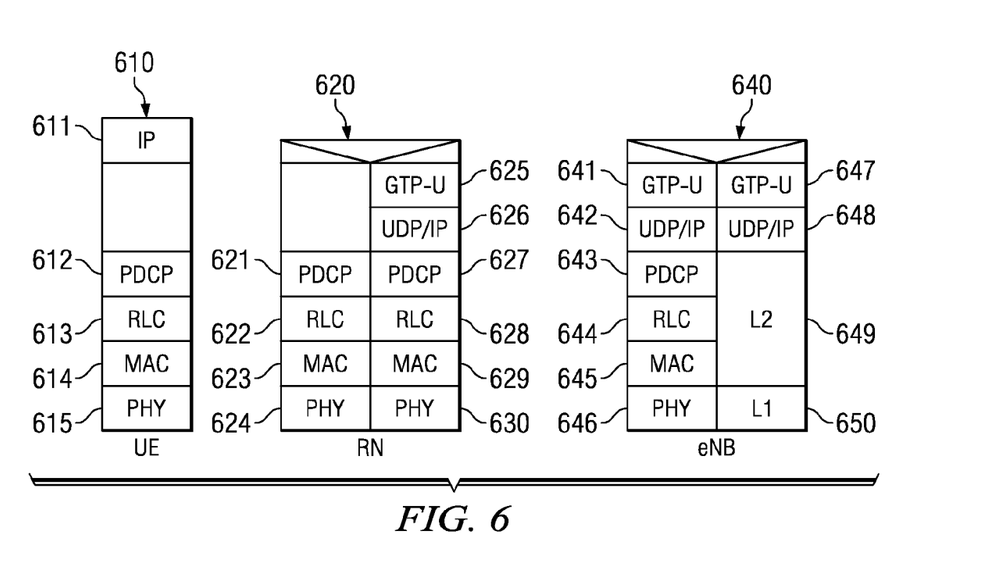
FIG. 6 illustrates the protocol layers for a relay node classified as a L3 relay.

FIGS. 3 to 6 illustrate classification of RN based on which protocol layer the user data packet is available at RN 202. FIG. 3 illustrates the user-plane protocol layers for an RN classified as a L0/L1 relay. FIGS. 4 and 5 illustrate the user-plane protocol layers for an RN classified as a L2 relay. FIG. 6 illustrates the protocol layers for an RN classified as a L3 relay.

FIG. 3 illustrates the user-plane protocol layers of an L1 relay. Protocol layers 310 of UE 203 includes Internet Protocol (IP) layer 311, Packet Data Convergence Protocol (PDCP) L2 sub-layer 312, Radio Link Control (RLC) L2 sub-layer 313, Medium Access Control (MAC) L2 sub-layer 314 and Physical layer (PHY) layer 315. Protocol layers 330 of eNB 201 includes PDCP L2 sub-layer 331, RLC L2 sub-layer 332, MAC L2 sub-layer 333 and PHY layer 334 on the UE side. Protocol layers 330 of eNB 201 includes user plane GPRS Tunneling Protocol (GTP-U) 335, User Datagram Protocol (UDP/IP) 336 and backhaul data link layers (L2/L1) stacks 337 and 338 on the Core Network (CN) side. A L0 relay is the conventional repeater, where the received signal is amplified and forwarded in the analog front end. Strictly speaking, L0 relay does not even involve the PHY layer. L1 relays can be viewed as advanced repeaters. As illustrated in FIG. 3 protocol layer 320 of RN 202 includes only a PHY protocol layer. In RN 202 the received signal is processed by PHY layer 320. One exemplary PHY process in a L1 relay is frequency domain filtering. In this exemplary process only the useful signal is forwarded.

FIG. 4 illustrates the user-plane protocol layers of a L2 relay. Protocol layers 410 of UE 203 includes IP layer 411, PDCP L2 sub-layer 412, RLC L2 sub-layer 413, MAC L2 sub-layer 414 and PHY layer 415. Protocol layers 430 of eNB 201 similarly includes PDCP L2 sub-layer 431, RLC L2 sub-layer 432, MAC L2 sub-layer 433 and PHY layer 434 on the UE side. Protocol layers 430 of eNB 201 further includes GTP-U protocol 435, UDP/IP protocol 436 and backhaul data link layers (L2/L1) stack 437 and 438 on the CN side. In the example of a L2 relay illustrated in FIG. 4, RN 202 includes protocol layers 420. Protocol layers 420 includes PDCP L2 sub-layer 421, RLC L2 sub-layer 422, MAC L2 sub-layer 423 and PHY layer 423. An L2 relay involves protocol layers above PHY. These additional protocol layers permit advanced functions RN 202 to improve system performance. Scheduling and Hybrid ARQ (HARQ) are two important functions that are available at the L2 relay. L2 relays include at least L2 sub-MAC layer 423 in addition to PHY layer 423. In the example of FIG. 4, the L2 relay includes all L2 sub-layers and receives/forwards PDCP service data units (SDUs).

FIG. 5 illustrates the user-plane protocol layers of another embodiment of a L2 relay. Protocol layers 510 of UE 203 includes IP layer 511, PDCP L2 sub-layer 512, RLC L2 sub-layer 513, MAC L2 sub-layer 514 and PHY layer 515. Protocol layers 530 of eNB 201 include PDCP L2 sub-layer 531, RCL L2 sub-layer 532, MAC L2 sub-layer 534 and PHY layer 535 on the UE side. Protocol layers 530 of eNB 201 further includes GTP-U protocol 535, UDP/IP protocol 536 and backhaul data link layers (L2/L1) stack 537 and 538 on the CN side. In the example of a L2 relay illustrated in FIG. 5, RN 202 includes protocol layers 520. Protocol layers 520 includes RLC L2 sub-layer 521, MAC L2 sub-layer 522 and PHY layer 523. Protocol layers 520 receive and forward RLC SDUs.

FIG. 6 illustrates the protocol layers of a L3 relay. Protocol layers 610 of UE 203 includes IP layer 611, PDCP L2 sub-layer 612, RLC L2 sub-layer 613, MAC L2 sub-layer 614 and PHY layer 615. Protocol layers 640 of eNB 201 include on both RN and CN sides GTP-U protocol 641/647 and UDP/IP protocol 642/648. Protocol layers 540 of eNB 201 include at the lower levels PDCP L2 sub-layer 643, RLC L2 sub-layer 644, MAC L2 sub-layer 645 and PHY layer 546 on the RN side, and backhaul data link layers (L2/L1) stacks 649/650 on the CN side. Apart from the low layer CN backhaul functions 649/650, a L3 relay has all functions that an eNB has receiving and transmitting IP packets to its donor eNB in a similar way as if they were sent or received on the X2 interface. In the example of a L3 relay illustrated in FIG. 6, RN 202 includes protocol layers 620. Protocol layers 620 include on both UE and eNB sides a full L1 and L2 protocol stack including PDCP L2 sub-layer 621/627, RLC L2 sub-layer 622/628, MAC L2 sub-layer 623/629 and PHY layer 624/630. On the eNB side, protocol layers 520 include GTP-U protocol 625 and UDP/IP protocol 626. L3 relay receives and forwards IP packets requiring inclusion of IP layer 621 to view user packets. A L3 relay has all functions that an eNB has. A L2 relay it communicates with its donor eNB through an X2-like interface.

In FIGS. 3 to 6 different relay types are classified based on at which protocol layer the U-plane data unit is visible at the relay node. Additional protocol layers may be needed for C-plane data unit for each type of relays.

The frequency band of link between eNB 201 and RN 202 may be the same or different than frequency band of the link between RN 202 and UE 203. This provides the following classifications of relay nodes: 1) in-band relay, where the link between eNB 201 and RN 202 shares the same frequency band as the link between RN 202 and UE 203; and 2) out-band relay, where the link between eNB 201 and RN 202 has a different frequency band than the link between RN 203 and UE 203. An out-band relay includes the case where the link between eNB 201 and RN 202 uses a different technology from the radio access technology, such as microwave transmissions. An in-band relay requires no additional frequency band. An out-band relay does not create additional interference since the signal on the link between eNB 201 and RN 202 uses a separate frequency band than the link between RN 202 and UE 203.

Due to implementation limitations, it is difficult for a relay node to transmit and receive on the same frequency band at the same time. Therefore, two different types of in-band relays exist: time division (TD) relays; and frequency division (FD) relays. TD relays separate the transmission and reception in the time domain. Either the transmission or the reception can occur over the whole bandwidth. TD relays require switching time between transmission and reception. FD relays separate transmission and reception in the frequency domain. Either transmission or reception can occur in all subframes. FD relays produce interference leakage between the frequency bands for transmission and reception that can degrade the system performance.

Thus there are many ways to characterize a relay node. Two types of relay nodes that are interesting to study for LTE-A.

L0/L1 relay operates on the physical layer, therefore, outband L0/L1 relay does not seem to be reasonable. L0 relays have been deployed in existing systems. A L1 relay may incur additional processing delay. Overall, L0/L1 relays are for coverage extension. Limited specification effort is needed for L0/L1 relays.

A L2 relay can be an in-band relay or an out-band relay. An in-band L2 relay does not need to support a specific backhaul type such as microwave of fiber optic cable nor does it require any additional frequency band and associated additional Radio Frequency (RF) equipment. Thus an in-band L2 relay saves the associated operational expense (OPEX) and capital expense (CAPEX) of operating a network and potentially offers both coverage and capacity improvements. The MAC layer at the L2 relay node such as MAC layer 422 illustrated in FIG. 4 enables these system gains. For an out-band L2 relay, if the physical layer or the MAC layer on the link from eNB 201 to RN 202 does not use the same technology as the link from RN 202 to UE 203, then the out-band L2 relay serves as a bridge. This complicates implementation of RN 220. For an out-band L2 relay, if the physical layer or the MAC layer uses the same technology on both the links from eNB 201 to RN 202 and from RN 202 to UE 203, then the same air interface is required on the additional frequency band. Thus the benefit of an out-band L2 relay is not clear. Note that depending on how capable MAC layer 423 is in the L2 relay, significant specification changes may be required on both physical layer 424 and the MAC layer 423.

An L3 relay can also be in-band or out-band. An out-band L3 relay can be of interest since other communication techniques can be employed for the link from eNB 201 to RN 202 than the link from RN 202 to UE 203. For example, the L1/L2 protocol peers 630/646, 629/645, 628/644 and 627/643 of the radio link between eNB 201 to RN 202 in FIG. 6 do not necessarily need to be from the radio access technology. In-band L3 relay does not provide any apparent gain over in-band L2 relay. An in-band L3 relay may introduce additional latency. Thus an in-band L3 relay does not offer much practical application. One merit of an L3 relay is that little specification change is required on physical layer 625/630 and the MAC layer 624/629 since the IP packet is forwarded to the eNB similar to transmission over the X2 interface.

An in-band L3 relay appears advantageous for the apparent minimum specification and implementation changes required from current LTE L2 relay protocol stack. In both L2 and L3 relay forwarding approaches, it is advantageous to aggregate all PDCP (or RLC) SDUs or GTP/UDP/IP packets of UEs of the same RN on the in-band backhaul on one transport channel or a limited number of transport channels. These signals share the same radio link at the same time. All UE data can be forwarded on the in-band backhaul using the same Modulation and Coding Scheme (MCS) and transport channel saving signalling overhead. Some differentiation may be foreseen though between UE bearers with different Quality of Service (QoS), for example regarding link adaptation. It is better for minimizing interference if backhaul transmissions, which are generally at higher power than UE transmissions, be concentrated in a packed resource rather than distributed.

For L2 relay forwarding, the RLC SDUs of different UEs are aggregated in a single backhaul RLC PDU associated with a specific logical channel identifier (LCID). Such a RLC PDU will now potentially concatenate RLC SDUs generated by different PDCP entities in contrast to Rel-8. The backhaul LCID reuses the current LCID format thus not needing any particular specification. When the relay node receives an aggregated backhaul RLC SDU from the eNB, the relay node identifies and distributes each individual RLC SDU to the appropriate LCID queues at the (DL) RLC input. Similarly, when the eNB receives an aggregated RLC SDU on the in-band backhaul from the relay node, the eNB identifies and distributes each individual RLC SDU to its appropriate PDCP entity.

The issue mentioned above regarding multiplexing/demultiplexing RLC SDUs of different Radio Bearers aggregated in a single backhaul RLC and MAC PDU needs to be solved. Upgrading the current RLC functionality so that RLC header supports tagging of the LCID of the different RLC SDUs carried in the RLC PDU solves the problem. Since the LCID is already used in legacy MAC L2 sub-layer to allow multiplexing/demultiplexing RLC PDUs of different radio bearers of the same UE in a MAC PDU, the above solution can as well be implemented in the MAC L2 sub-layer, as elaborated below.

Figure 7:
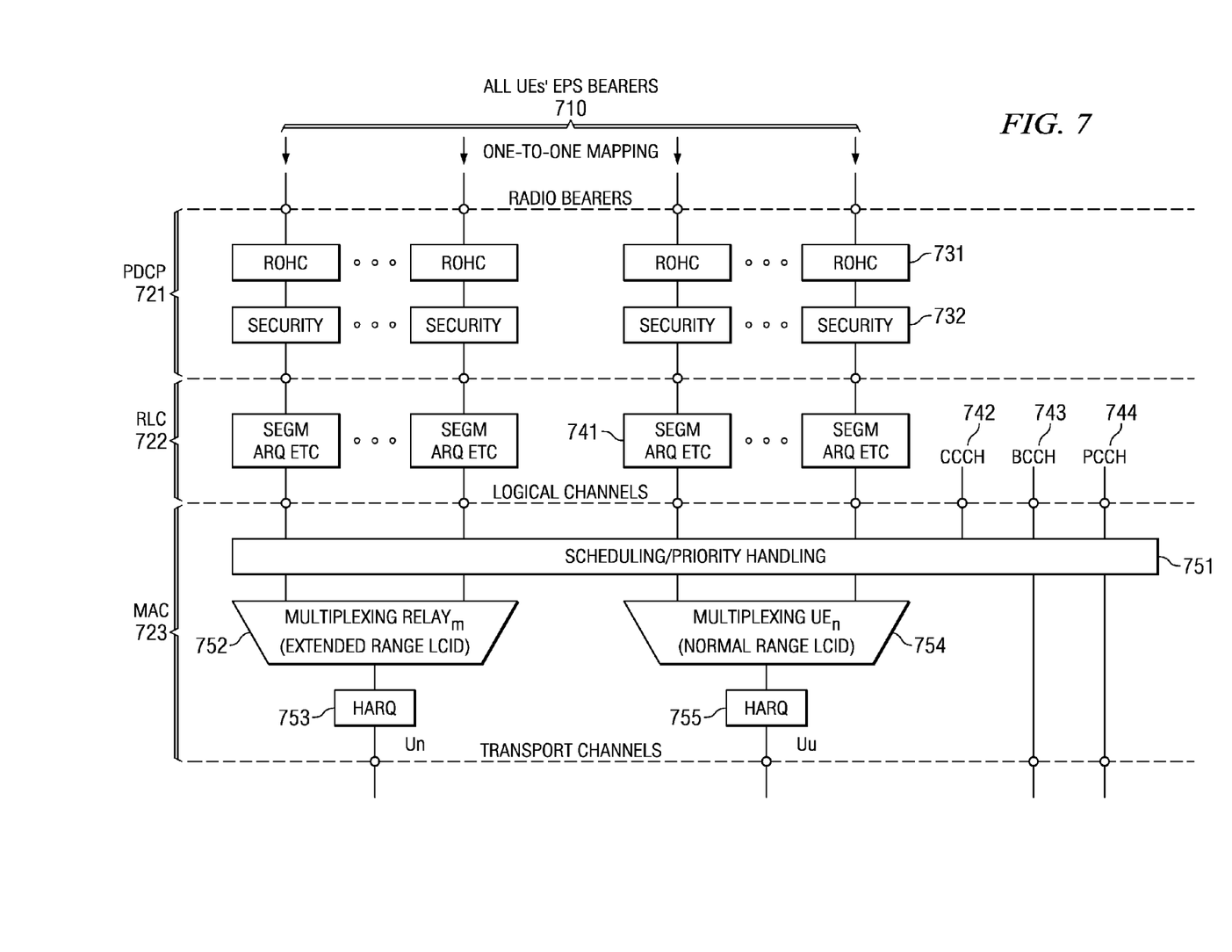
FIG. 7 illustrates the structure for downlink donor base station multiplexing on both links between the base station and the relay node and the relay node and the user equipment.
Figure 8:
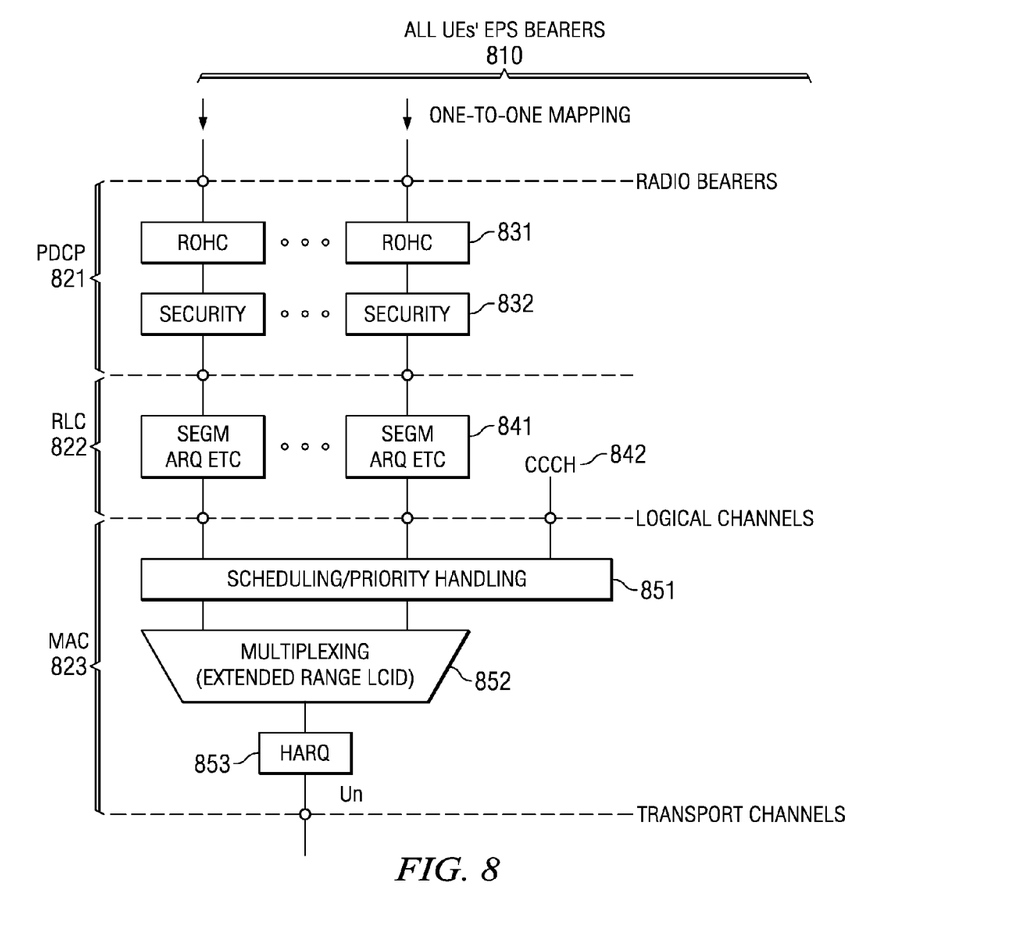
FIG. 8 illustrates the structure for uplink relay node multiplexing on the relay node and the user equipment.

FIGS. 7 and 8 illustrate the RN multiplexing of UEs. FIG. 7 illustrates the Layer 2 structure for LTE-A downlink donor eNB multiplexing on Un and Uu. FIG. 8 illustrates the Layer 2 structure for LTE-A uplink RN multiplexing on only Uu.

FIG. 7 illustrates receiving from all UE EPS bearers 710. PDCP L2 sub-layer 721 includes a one-to-one mapping of a Robust Header Compression (RoHC) circuit 731 and a security circuit 732 for each radio bearer. RLC L2 sub-layer 722 includes a one-to-one mapping of segment ARQ circuit 741 for each radio bearer. RLC L2 sub-layer 722 permits inputs from CCCH 742, BCCH 743 and PCCH 744. MAC L2 sub-layer 723 includes scheduling/priority handling circuit 751 receiving signals from all the input channels. Multiplexing Relay$_m$ 752 multiplexes plural signals and supplies HARQ circuit 753 which provides a Un output. Multiplexing UE$_n$ 754 multiplexes plural signals and supplies HARQ circuit 755 which provides a Uu output. Scheduling/priority handling circuit 751 includes the provision for additional channel outputs. FIG. 8 illustrates receiving from all UE EPS bearers 810. PDCP L2 sub-layer 821 includes a one-to-one mapping of a RoHC circuit 831 and a security circuit 832 for each radio bearer. RLC L2 sub-layer 822 includes a one-to-one mapping of segment ARQ circuit 841 for each radio bearer. RLC L2 sub-layer 722 permits a CCCH 742 input. MAC L2 sub-layer 823 includes scheduling/priority handling circuit 851 receiving signals from all the input channels. Multiplexing circuit 852 multiplexes plural signals and supplies HARQ circuit 853 which provides a Un output. As noted in FIGS. 7 and 8 the multiplexers 752, 754 and 852 employ an extended range LCID.

In FIGS. 7 and 8 GTPU tunnels are terminated at the donor eNB and mapped onto the RN radio bearers in the donor eNB as in a prior art eNB. Donor eNB provisions as many Un DRBs/SRBs to support one-to-one mapping with UE EPS bearers. Then Un DRBs/SRBs are multiplexed on the same transport block by extending the LCID field to address all of them. The required changes at L2 MAC are small as they reduce to allow multiplexing RLC SDUs from different UEs in the same MAC PDU, and LCID extension. This provides a small overhead since extending the current 5-bit LCID to only 2 bytes would be sufficient to address 65536 bearers under the RN. Due to the likely good radio link on Un, MAC is expected to form large transport blocks carrying multiple concatenated packets of the same UE/Radio Bearer (RB) in the same Transmission Time Interval (TTI). Hence, most of the time only one instance of the LCID will tag multiple packets of the same UE/RB, thus further reducing the overhead increase per packet to about 1 byte compared to legacy LCID. This does not require any new compression scheme and allows minimizing the RN complexity by requiring no unnecessary protocol termination.

The UE bearers mapping/aggregation on Un is not visible outside donor eNB/RN L2. No particular RN/UE (Un) bearer, on top of SRBs and the default DRB, needs to be set-up over S1 upon RN setup. There is a one-to-one correspondence between Un RBs and Uu RBs in the RN. Hence EPC implicitly controls Un RBs through Uu RBs. Handling the Un multiplex at L2: minimizes the overhead increase to less than about 1 byte per packet; minimizes the changes required at L2 to MAC LCID extension requiring no new header compression; and minimizes both the donor eNB and RN processing requirements and the consequent cost.

The proposed L2 structure can be further enhanced by differentiating RBs with different QoS in the MAC layer through the support of multiple MAC PDUs in the same TTI. Instead of multiplexing all RBs of all UEs scheduled in the transport block issued in a TTI with the same MCS, a QoS dependent link adaptation could be implemented independently for each MAC PDU and transport block in the TTI.

For relay L3 forwarding, the PDCP packets are decompressed reversing the RoHC, decrypted and reconstituted into IP datagrams on the receiving side. The L3 relay then ROHC and encrypts them again on the sending side. Thus there are separate eNB to relay and relay to UE links on the IP layer. The data aggregation of the UE on the in-band backhaul implies that the IP packets of different UEs and Radio Bearers (RBs) are aggregated to form a single backhaul Radio Bearer identified by a unique GPRS Tunneling Protocol—User plane (GTP-U) tunnel ID. Unlike in Rel-8, a PDCP entity now carries the data of multiple RBs. This new type of RB might not inherit from current Rel-8 specification as is the case of above backhaul LCID. This may a Data Radio Bearer (DRB) or a Signalling Radio Bearer (SRB) or a newly specified type. It could reuse the 8 available DRBs of the legacy Uu interface. This DRB may be mapped to another EPS bearer such as a RN EPS bearer managed by the RN Mobility Management Entity (MME) node in the RN Evolved Packet Core (EPC) in the same way a MME manages UE bearers in legacy systems. When the relay receives an backhaul PDCP SDU from the eNB on Un, the relay identifies the UE bearer based on its GTP tunnel, terminates the GTP/UDP/IP interface and distributes the resulting IP packet to the appropriate SRB/DRB queue at the (DL) PDCP input. When the eNB receives a PDCP SDU on the in-band backhaul from the relay on Un, the eNB terminates the GTP/UDP/IP interface, identifies the UE bearer based on its GTP tunnel and distributes the resulting IP packet to its appropriate GTPU tunnel on the network side.

Aggregation of the IP packets of different UE bearers in the same RN bearer raises several issues. A first issue is Robust Header Compression (RoHC). In this invention the IP packets travelling through Un's PDCP are GTP/UDP/IP packets, which header is made of an aggregation of heterogeneous headers such as GTP/UDP/IP/RTP/UDP/IP. Such header aggregation is not supported by legacy RoHC profiles. This invention requires support of a global RoHC profile operating on multiple concatenated heterogeneous headers. Running header compression on the inner header only is useless. Disabling RoHC is also one option preventing from any specification changes, but this implies carrying the large header overhead on Un, hence results in weaker spectral efficiency. Finally, due to the duplicated PDCP and an additional L3 protocol stack, in-band L3 relays require more processing overhead than in-band L2 relays.

Table 1 summarizes the comparison of L2 and L3 in-band relay nodes.

TABLE 1

| | L2 Relay | L3 Relay |
|---|---|---|
| Specification and implementation impact | LCID extension | One Un PDCP entity can carry the data of multiple Un RBs |
| RoHC | No issue | RoHC needs to be upgraded or skipped |
| Complexity | Minimum | Higher complexity due to more u-plane protocol stacks |

Table 1 shows that L3 in-band relays requires at least as much specification and implementation changes as L2 in-band relays. L3 in-band relays also involve additional RoHC issues.

This application will focus only on in-band L2 relays and out-band L3 relays. From now on, reference to an L2 relay means an in-band L2 relay. Reference to a L3 relay means an out-band L3 relay.

Figure 9:
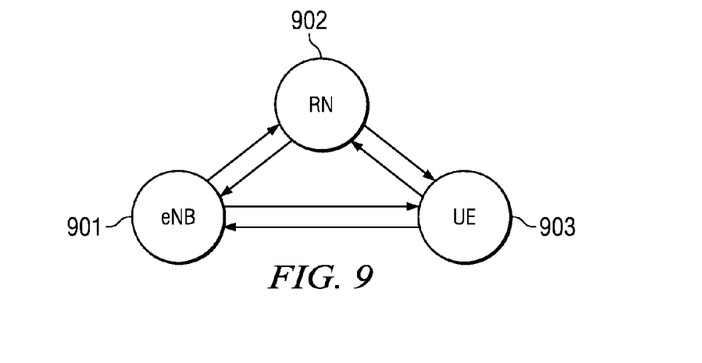
FIG. 9 illustrates an example of a 2-hop relay system including direct communication between the user equipment and the donor base station.

A L2 relay may provide greater additional capacity improvement than L3 relay, if a direct link from eNB 201 to UE 203 can be sufficiently exploited. FIG. 9 illustrates such a system. RN 902 relays signals between eNB 901 and UE 903 as previously illustrated in FIG. 2. Not previously illustrated, eNB 901 also directly communicates with UE 903 as shown in FIG. 9. For out-band L3 relay, the communication link between eNB 901 and RN 902 may not be accessible to UE 903. Therefore, UE 903 can only see the signal from RN 902 for such a L3 layer.

Due to the processing delays in L2 relay, at least one of UE 903 or eNB 901 buffers the received data. This enables full utilization of all copies of the received signals. This increases the complexity of UE implementations. This requires that UE 903 to be able to recognize RN 902 and distinguish transmissions from RN 902 from transmissions from eNB 901. This assumes non-transparent relay operation. The potential capacity benefit of a L2 relay is only achievable for Rel-10 UEs. L2 and L3 relays may provide similar performance for Rel-8 UEs, since Rel-8 UEs are either unable to distinguish transmissions from RN 902 and transmissions from eNB 901 for the transparent case, or can only have one of them as serving node for the non-transparent case.

One limitation with in-band backhaul is that the relay node cannot simultaneously receive and transmit on the same band. Another limitation is that Rel-8 UEs always expect to receive cell-specific reference signals (CRS) in all DL subframes. These limitations make it advantageous to insert relays in Rel-8 networks using Multimedia Broadcast multicast service Single Frequency Network (MBSFN). Such MBSFN subframes are already enabled in LTE to address forward compatibility beyond the control symbols. In MBSFN subframes, Rel-8 UEs are aware that CRS are only transmitted in the first and second OFDM symbols. The relay has the opportunity to receive data from the eNB while not transmitting to UE during the following symbols.

Figure 10:
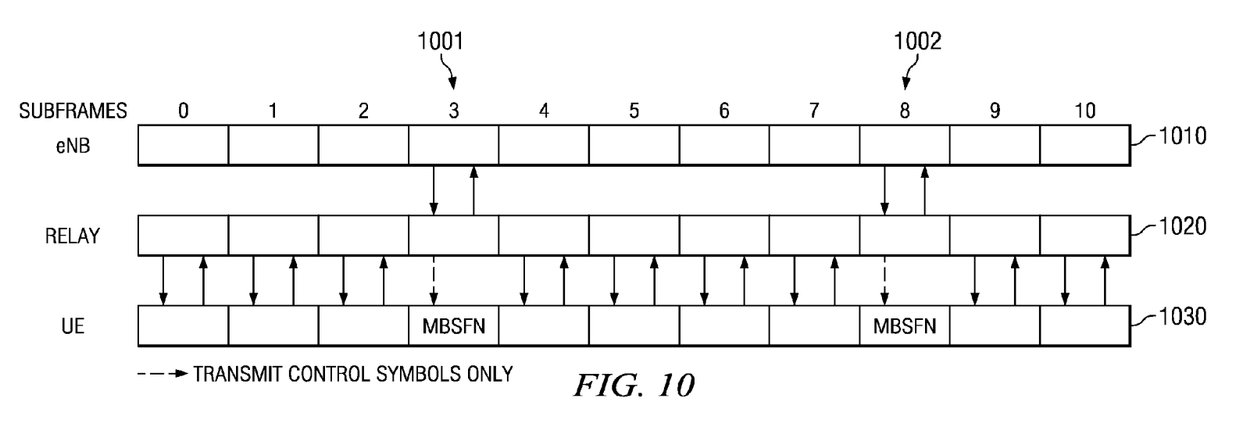
FIG. 10 illustrates an example of a relay node in-band backhaul transmission.

FIG. 10 illustrates an example of a relay node in-band backhaul transmissions. FIG. 10 illustrates eNB subframes 1010, RN subframes 1020 and UE subframes 1030. FIG. 10 illustrates a MBSFN subframe 1001 in subframe 3 and a MBSFN subframe 1002 in subframe 8. The eNB serves as its own UEs in all subframes, but these transmissions are omitted in FIG. 10 for readability.

MBSFN subframes need to be used only for subframes involving eNB to RN (DL) transmissions. RN to NB (UL) transmissions can take place in any subframes if the RN can configure blank UL subframes by not allocating or cancelling any UE to RN UL transmission during these subframes as detailed below.

Figure 11:
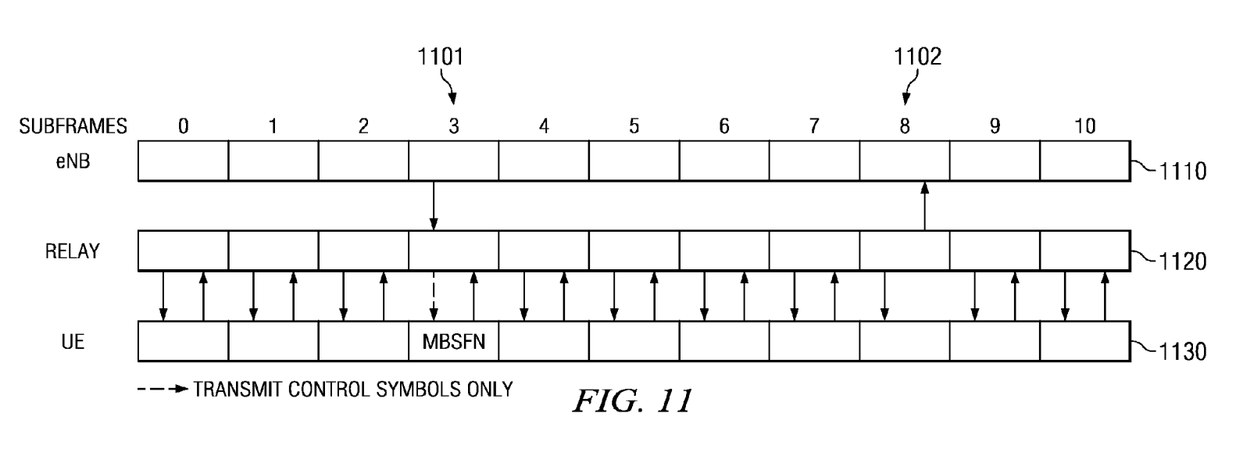
FIG. 11 illustrates an example of an in-band backhaul subframe involving only one-way transmission.

FIG. 11 illustrates an example of an in-band backhaul subframe involving only one-way transmissions. FIG. 11 illustrates showing an example of a relay node in-band backhaul transmission. FIG. 11 illustrates eNB subframes 1110, RN subframes 1120 and UE subframes 1130. FIG. 11 illustrates a MBSFN subframe 1101 in subframe 3 where the subframe includes only DL control signals. FIG. 11 illustrates subframe 1102 in subframe 8 where the UE does not have an UL transmission.

The flexibility in configuring the in-band backhaul subframes where DL transmission takes place is limited by the MBSFN subframe configurability. Table 2 shows the current MBSFN patterns. These are periodic patterns of one frame period and MBSFN cannot be configured in subframes 0, 4, 5 and 9.

TABLE 2

| MBSFN pattern/subframe | 0 | 1 | 2 | 3 | 4 | 5 | 6 | 7 | 8 | 9 |
|---|---|---|---|---|---|---|---|---|---|---|
| 0 | | x | | | | | | | | |
| 1 | | x | x | | | | | | | | |
| 2 | | x | x | x | | | | | | | |
| 3 | | x | x | x | | | x | | | | |
| 4 | | x | x | x | | | x | x | | | |
| 5 | | x | x | x | | | x | x | x | | |

The previous description of specific subframes for running in-band backhaul transmissions assumes no RN to UE transmission can occur during these subframes except for legacy DL control symbols. However the UL RN to eNB backhaul transmissions can be limited to one slot such as the first slot in these subframes. This enables UE to RN transmissions in the second slot. The RN can receive PUCCH ACK/NACK and SRI of good geometry UEs as well as Sounding Reference Signal (SRS). The RN can further anticipate provision for this by boosting the PUCCH transmissions accordingly through the PUCCH specific power control command.

Figure 12:
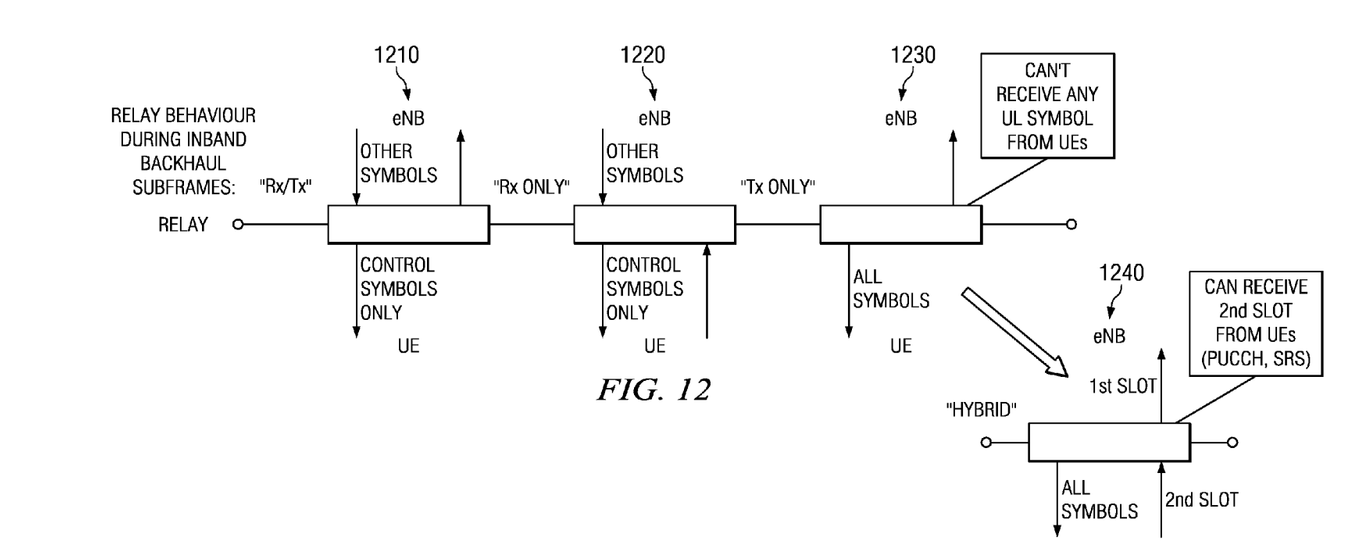
FIG. 12 illustrates the alternative communication types for backhaul transmission between a base station and a relay node.

FIG. 12 illustrates the alternative communication types for backhaul transmission between eNB and RN. In communication type 1210 the backhaul includes both transmission and reception by the RN. RN can transmit only control symbols to the UE during communication type 1210 and cannot receive UE transmissions. In communication type 1220 the backhaul includes both reception by the RN. RN can transmit only control symbols to the UE during communication type 1210 but can also receive signals from the UE. In communication type 1230 the backhaul includes transmission by the RN. RN can transmit all symbols to the UE during communication type 1230 and cannot receive UE transmissions. Communication type 1240 is the hybrid communication of this invention. In communication type 1240 the backhaul includes transmission by the RN in the first slot. RN can transmit all symbols to the UE during communication type 1230 and cannot receive UE transmissions in the second slot.

Figure 13:
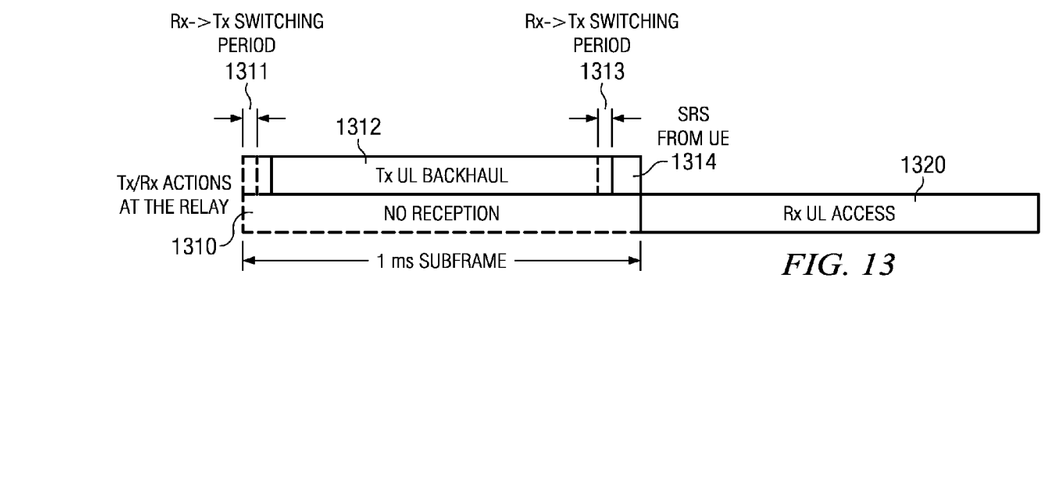
FIG. 13 illustrates the timing of switching from receiving to transmitting and from transmitting to receiving in the relay node according to this invention.

FIG. 13 illustrates another embodiment of the backhaul transmission between the eNB and RN. The RN must switch between transmit and receive modes in order to transmit on the UL backhaul to the eNB and receive UL access transmissions from the UE. FIG. 13 illustrates a first interval 1310 devoted to transmitting the UL backhaul and a second interval 1320 devoted to receiving the UL access signal. The first symbol of the UL backhaul subframe is punctured to allow a receive (Rx) to transmit (Tx) switching period 1311 at the RN. Normal signaling is permitted during interval 1312. The next to last SC-FDMA symbol is also punctured allowing a Tx to Rx switching period 1313. This switch to receiving mode allows the RN receive periodic SRS transmissions 1314 from the UE. FIG. 13 illustrates a normal UL subframe 1320 for the UL from UE to the RN.

This hybrid communication type has several implications. The RN can never receive Physical Control Format Indicator Channel (PCFICH), Physical Hybrid ARQ Indicator CHannel (PHICH) or Physical Downlink Control CHannel (PDCCH) transmissions from the eNB. The in-band backhaul transmissions take place on configured subframes. Therefore the UL/DL grants defining the resource for the transmission of the MAC PDU conveying the aggregated RLC SDUs for the UEs under RN coverage can be conveyed in a DL MAC PDU. These are denoted backhaul grant PDU and are similar to the Random Access Response (RAR). The resource allocation of this backhaul grant PDU is semi-persistently allocated (RRC).

This invention limits the relay behavior during in-band backhaul subframes as follows. Relay nodes shall not schedule RN to UE PDSCH initial transmissions, if the RN is expecting to receive data from eNB. Relay nodes shall not schedule UE to RN PUSCH initial transmissions, if the RN is expecting to transmit data to eNB. Relay nodes will cancel, whenever possible, the semi-persistent allocations of its serving UEs or rely on HARQ to recover them. Relay nodes will ignore and reply NACK to non-adaptive retransmissions received from its serving UEs. For PUCCH transmissions from UE the relay will either: address unavoidable ACK/NACK and SRI transmissions as DTX if in-band backhaul UL transmission takes place on both slots of the subframe; or attempt to detect ACK/NACK and SRI transmissions if in-band backhaul UL transmission takes place on the first slot of the subframe.

To support the proper operation of relay node in the network, the donor eNB shall be able to configure its RN. A new logical channel called the relay control channel (RCCH) is used for such a purpose. From a protocol layer point of view, although PDCP seems unnecessary for U-plane in the L2 relay it can be needed for C-plane. The RCCH enables the eNB to configure the RLC and MAC at the RN. The RN can be regarded as an off-site buffer for eNB. The properties of the RLC and MAC in eNB shall be mostly replicated at the RN. The eNB shall communicate the association between UE and radio bearers, the priorities among multiple UEs, the priorities of multiple logical channels of a single UE, the Quality of Service (QoS) of multiple radio bearers to the RN.

What is claimed is:

1. A method for extending the coverage and/or improving the capacity of wireless communication networks comprising:
    inserting a Relay Node (RN) in the Radio Access Network (RAN) where the RN relays the signal between a Base Station node (eNB) and a User Equipment (UE);
    wirelessly connecting the RN to the eNB;
    wherein the eNB uses the same radio access technology (RAT) for a radio link between the eNB and the UE and a radio link between the eNB and the RN;
    wherein the RN uses the same RAT for a radio link between the eNB and the RN and a radio link between the RN and the UE; and
    wherein the RN supports at least a Physical Layer (PHY), a Medium Access Control (MAC) sub-layer and a Radio Link Control (RLC) sub-layer protocol.

2. The method of claim 1, wherein:
    the RN is an out-band relay where the radio link between the eNB and the RN and the radio link between the RN and the UE radio link are at different frequencies.

3. The method of claim 2, wherein:
    the RN further supports L2 relay and L3 relay protocol stacks of the eNB.

4. The method of claim 1, wherein:
    the RN is an in-band relay where the radio link between the eNB and the RN and the radio link between the RN and the UE share the same frequency.

5. The method of claim 4, further comprising the step of:
    separating in time by means of a Rx/Tx switching point the uplink transmission and reception and the downlink transmission and reception between the UE and the RN.

6. The method of claim 5, further comprising the step of:
performing uplink (UL) RN to eNB backhaul transmissions occur at pre-configured sub-frames using radio resources dynamically allocated by the eNB via Relay Control Channel.

7. The method of claim 6, further comprising the step of:
semi-statically configuring the Relay Control Channel radio resources the eNB.

8. The method of claim 5, wherein:
the UL RN to eNB backhaul transmissions have a granularity smaller than one sub-frame.

9. The method of claim 8, wherein:
said step of performing UL RN to eNB backhaul transmissions includes performing the UL RN to eNB backhaul transmissions in a first part of a sub-frame and performing UE to RN Sounding Reference Signal (SRS), Physical Uplink Control CHannel (PUCCH) Acknowledge (ACK)/Not Acknowledge (NACK) and PUCCH Scheduling Request Indicator (SRI) transmissions can in a remaining part of the sub-frame.

10. The method of claim 1, wherein:
the RN is a Layer 2 relay node which further supports a Packet Data Convergence Protocol (PDCP).

11. The method of claim 10, further comprising the steps of:
one-to-one mapping the Evolved Packet System (EPS) bearers of the UE onto the RN to eNB in-band backhaul (Un) radio bearers; and
associating the Un radio bearers to the RN to UE (Uu) radio bearers.

12. The method of claim 11, wherein:
said step of one-to-one mapping the Evolved Packet System (EPS) bearers of the UE onto the RN to eNB in-band backhaul (Un) radio bearers includes multiplexing Radio Link Control (RLC) Service Data Units (SDUs) of different UEs into the same Medium Access Control (MAC) Protocol Data Unit (PDU) transmitted to and received from the RN.

13. The method of claim 12, further comprising the step of:
extending the Logical Channel ID (LCID) to 2 bytes to support a range of UEs and radio bearers served by the RN.

14. The method of claim 11, further comprising the step of:
carrying and integrity protecting the Non-Access Stratum (NAS) messages on Signaling Radio Bearers (SRB).

* * * * *